Inventors
Fred H. Osborne
Michael J. Corbett
By Olson, Trexler, Wolters & Bushnell attys.

Jan. 7, 1969   F. H. OSBORNE ET AL   3,420,532
RECORD POPULARITY INDICATOR
Filed May 18, 1967   Sheet 3 of 4

Inventors
Fred H. Osborne
Michael J. Corbett

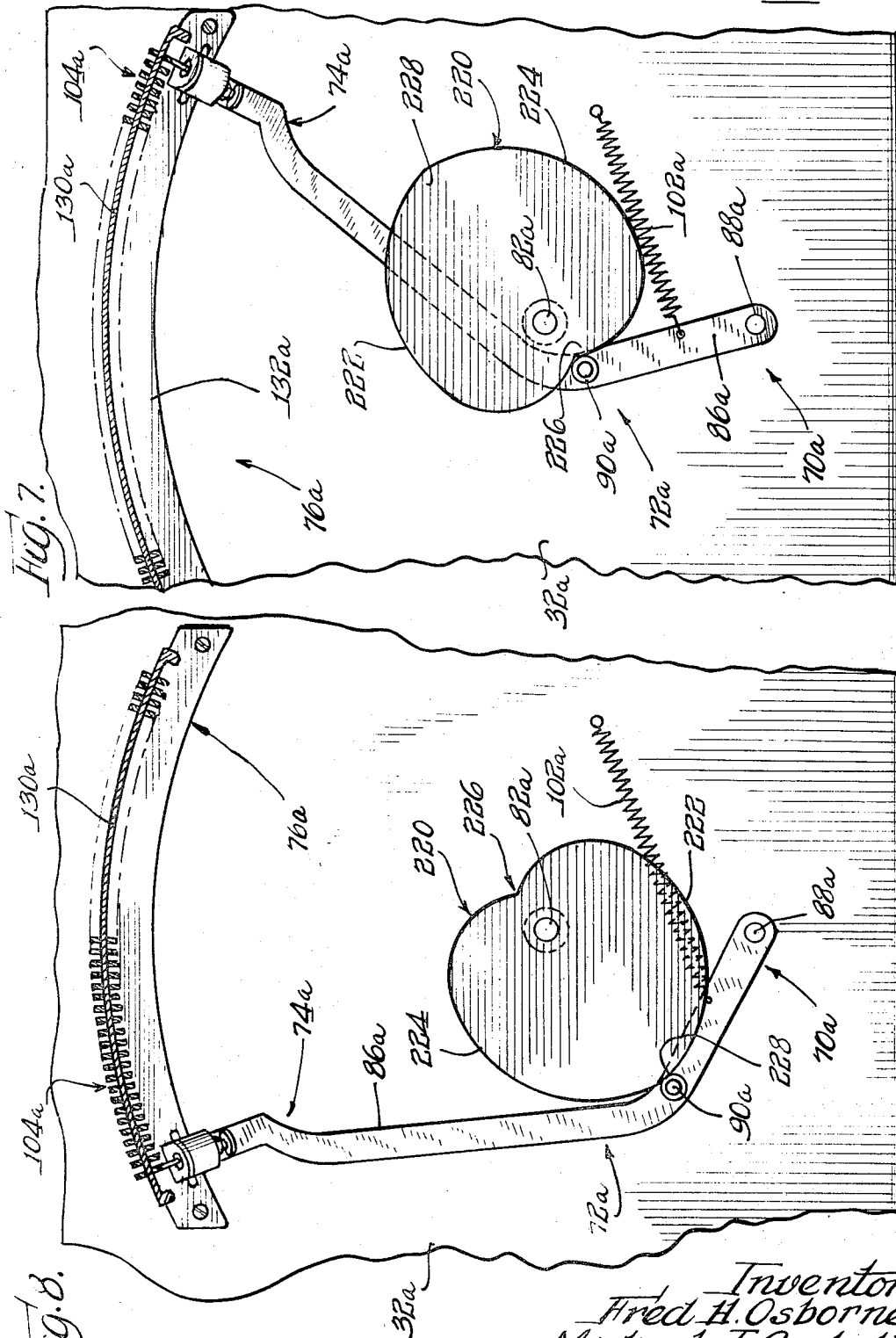

United States Patent Office 3,420,532
Patented Jan. 7, 1969

3,420,532
RECORD POPULARITY INDICATOR
Fred H. Osborne, Williamsville, and Michael J. Corbett, North Tonawanda, N.Y., assignors to The Wurlitzer Company, Chicago, Ill., a corporation of Ohio
Filed May 18, 1967, Ser. No. 639,513
U.S. Cl. 274—10                                15 Claims
Int. Cl. G11b 15/00; G11b 17/08

ABSTRACT OF THE DISCLOSURE

This invention relates to an automatic phonograph assembly including a magazine for holding a plurality of records and an indicator assembly for indicating the relative popularity of each record of said plurality of records.

Disclosure

Popularity indicators are often used in connection with automatic phonographs which play a plurality of records to register the number of times each record is played. The popularity indicator enables a serviceman to readily determine which records, of the plurality of records in the automatic phonograph, are being played most often at a particular location or business establishment. The records which are shown by the popularity indicator to be played seldom if ever can be replaced by the serviceman with other records which have a greater popularity potential.

The popularity indicators which have been previously associated with automatic phonographs are bulky and use complex drive assemblies. These drive assemblies frequently become out of phase with the record magazines, so that when one record is played the popularity registration of another record is increased. Another problem encountered in prior art indicators arises from the use of actuator assemblies which are not positive in their action. Therefore, prior art automatic phonograph assemblies tend to make partial or incomplete registrations when a record is being played. These incomplete registrations are usually compounded during sequential actuation of the popularity indicator and often result in substantial error in a popularity registration in the indicator.

Therefore, a general object of the present invention is to provide a record popularity indicator which overcomes the aforementioned shortcomings of prior art constructions. Specifically, it is an object of this invention to provide a compact, inexpensive popularity indicator for use in an automatic phonograph assembly.

Another object of this invention is to provide a compact positive drive assembly for a popularity indicator associated with an automatic phonograph.

Another object of this invention is to provide an actuator assembly which accurately operates a popularity indicator each time a record is played.

These and other objects and features of the invention will become more apparent upon a consideration of the following detailed description, taken in connection with the accompanying drawings wherein:

FIG. 4 is an enlarged perspective front elevational view of a register or indicator assembly of the record popularity meter or counter assembly;

FIG. 5 is an enlarged sectional view, taken along the line 5—5 of FIG. 4, further illustrating the structure of the register or indicator assembly;

FIG. 6 is an enlarged perspective rear view of the register assembly ilustrating a register zeroizing or indicator pin return assembly;

FIG. 7 is an enlarged plan view of a second embodiment of the record popularity meter or counter assembly wherein a heart-shaped cam is used, the cam being shown in an initial position; and FIG. 8 is an enlarged plan view of a second embodiment of the invention, similar to FIG. 7, illustrating the cam in an intermediate position.

Figures 1, 2:
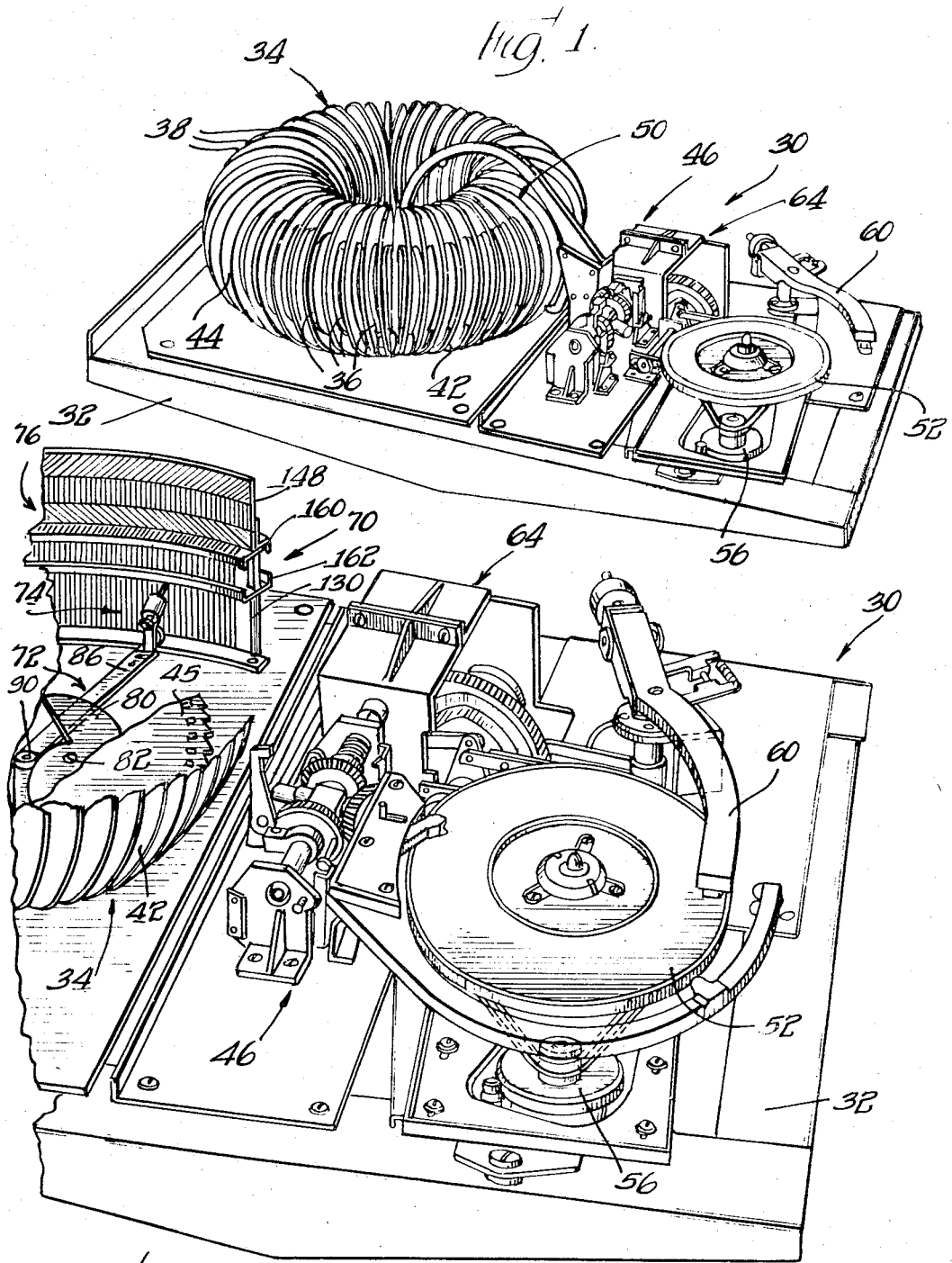
FIG. 1 is a perspective view of a record changer assembly of an automatic phonograph, including a record storage magazine, a record transfer assembly, a turntable, and a tone arm.
FIG. 2 is an enlarged perspective view, further illustrating the record changer assembly of FIG. 1, the record storage magazine being broken away to show a record popularity meter or counter assembly for registering or indicating the number of times each record in the record storage magazine is played.

Referring now to the drawings in greater detail, FIGS. 1 and 2 illustrate a record changer assembly 30. The record changer assembly 30 includes a base or support structure or frame 32 upon which a record storage magazine or basket 34 is rotatably mounted. The record storage magazine or basket 34 includes a plurality of panels 36 (see FIG. 1) which are positioned in a generally circular or toroidal configuration to define a plurality of record storage locations in which records 38 are stored or filed when they are not being played. The records 38 are of a disc type and have a spiral groove on each side of the record carrying recorded sound for reproduction by a phonograph. Since there is a recording on both sides of the record, the records are said to have a first or A side 42 and a second or B side 44. The A sides 42 are positioned facing in a clockwise direction when the record magazine 34 is viewed from above, while the B side 44 faces in an opposite or counterclockwise direction. The record storage magazine 34 is mounted on a base plate 45 (see FIG. 2) for rotation relative to the base frame 32 to position a selected record for engagement by the record transfer assembly 46. The record transfer assembly 46 engages a record at a pick-up or loading station 50, see FIG. 1, and transfers the record from the record storage magazine 34 to a turntable 52. The turntable 52 is rotated by a turntable drive motor 56 to rotate the record relative to a tone arm 60. The tone arm 60 engages the spiral recording groove in the upwardly facing or selected side of a record on the turntable to pickup or play the recorded sound on the record in a well known manner.

After the record has been played by the automatic phonograph, the record transfer assembly 46 repositions the record back in its storage location in the record storage magazine. The movement of the record transfer assembly 46, the turntable 52, and the tone arm 60 are coordinated by control mechanism 64. The preferred embodiment of the record changer assembly 30 is described in further detail in copending application Ser. No. 619,687, "Changer and Selector Mechanism," filed in the names of Fred S. Osborne, Robert S. Tuttle, and Michael J. Corbett. Although the record changer assembly disclosed in the aforementioned application is preferred for use in connection with the present invention, it will be apparent to those skilled in the art that other known record changer assemblies, rather than the preferred record change assembly 30, can be utilized.

Figure 3:
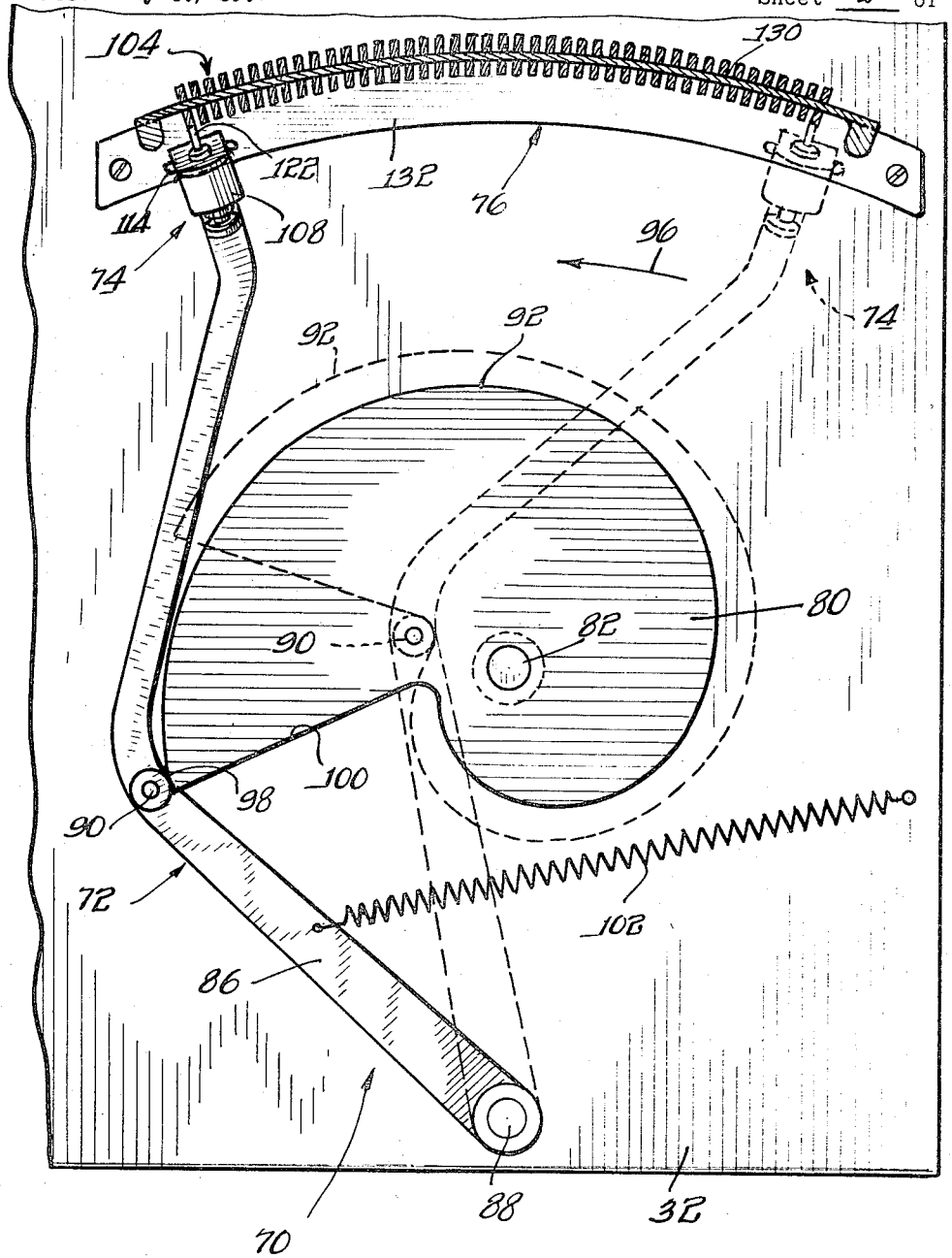
FIG. 3 is an enlarged plan view of the record popularity meter or counter assembly, the record magazine being removed from a base for the automatic phonograph for purposes of clarity of illustration.

A record popularity meter or counter assembly 70 is mounted on the base frame 32 of the automatic phonograph, as shown in FIGS. 2 and 3, for registering or counting the number of times each record 38 is played. The record popularity meter or counter assembly 70 includes a drive assembly 72 for positioning an actuator or operator assembly 74 relative to a popularity register or indicator assembly 76. The indicator assembly 76 projects upwardly from the base frame 32 and has an arcuate shape similar to an outer curvature of the record magazine 34. This similarity of shapes enables the indicator assembly 76 to be located closely adjacent to the record magazine 34 to provide a compact structure.

The drive assembly 72 includes a spiral drive cam 80 which is fixedly connected to a central drive or mounting shaft 82. The cam 80, as can be seen in FIG. 2 is mounted beneath and extends in a parallel relationship to the base plate 45 of the record magazine 34. The base plate 45 of the record magazine is fixedly connected to the shaft 82 so that the cam 80 and record magazine 34 are rotated as a unit relative to the base frame 32 of the automatic phonograph. The drive assembly 72 (see FIG. 3) also includes a pivot arm 86 which is connected by a pivot or mounting pin 88 to the base frame 32. A cam follower 90 is mounted on the pivot arm 86 for engagement with an outer spiral drive surface 92 of the cam 80.

Rotation of the record magazine 34 and cam 80 causes the arm 86 to be moved or pivoted from an initial position, shown in dashed lines in FIG. 3, wherein the follower 90 engages a radially innermost end of the cam 80. In this initial position, the actuator assembly 74 is located adjacent to a right end portion of the indicator assembly 76. As the record magazine and cam 80 are contemporaneously rotated in a clockwise direction by a suitable drive train, not shown, the follower 90 is moved radially outwardly to pivot the arm 86 in a counterclockwise direction or to the left, as indicated by the arrow 96 in FIG. 3. The leftward pivoting movement of the arm 86 continues until the follower 90 approaches a radially outermost end portion 98 of the cam 80. When the follower is on the radially outermost portion 98 of the cam, the actuator assembly 74 is positioned adjacent to a left or final end portion of the indicator assembly 76, as shown in solid lines in FIG. 3. The next few degrees of rotation bring the cam 80 and record magazine 34 to their initial positions and result in the cam follower 90 rolling or sliding inwardly on a radially projecting connector surface 100. A return spring 102 is attached to the pivot arm 86 to urge the pivot arm from the final position shown in solid lines in FIG. 3 to the initial position shown in dashed lines in FIG. 3. Of course, the pivot arm 86, cam 80 and record magazine 34 are not necessarily returned to the initial position each time a record is played. The indicator assembly 76 includes a plurality of register indicator pins or bars 104.

As is perhaps best seen in FIGS. 3 and 4, the number of indicator pins 104 corresponds to the number of record storage locations defined by the panels 36 in the record storage magazine 34 (see FIG. 1). Each of the pins 104 is associated with one, and only one, of the record storage locations in the record magazine 34.

During rotation of the record magazine to position a selected record for transfer to the turntable 52, the drive assembly 72 moves the actuator assembly 74 into alignment with a pin member 104 associated with the selected record 38 and record storage location. This movement of the actuator assembly 74 is accomplished by the spiral cam 80. The spiral cam 80 is shaped to move the arm 86 and actuator assembly 74 along an arcuate path so that the actuator assembly 74 is positioned at all times adjacent to an indicator pin 104 which is associated with a record position at the pick-up or loading station 50. The actuator assembly 74 is energized or operated each time a selected record is played to advance or raise one position an indicator pin 104 associated with the record to increase by one point or place the popularity rating or registration shown by the indicator assembly 76 for that record. In a preferred embodiment of the invention the actuator assembly 74 is energized each time a record selection cancel switch is operated over circuitry shown in considerable detail in copending application Ser. No. 619,686, "Electro-mechanical Selector Unit," filed in the names of Frank B. Lumney and Ronald P. Eberhardt. (The actuation of switch 714 in connection with the play meter solenoid should be particularly noted in the aforementioned case.)

The actuator assembly 74, as is perhaps best seen in FIG. 5, includes a solenoid 108 which is mounted on a bracket 110 connected to the arm 86 by a suitable connection means such as rivets or screws 112. The actuator assembly 70 and the arm 86 are supported by a wheel or disc 114 for movement along an arcuate path which is spaced a constant distance from the arcuate indicator assembly 76. Each time a record is played the solenoid 108 is energized to move a core piece or plunger 118 inwardly, that is in the direction indicated by an arrow 120. After the plunger 118 is moved inward for a predetermined distance, the inward movement is halted by stop shoulders formed on the core piece 118. During the inward movement, the pin member 104 adjacent to the drive assembly 74 is lifted or moved upwardly by driving engagement of a nose or outer end portion 122 of the core piece 118 with drive surfaces 124 of teeth 126 on the pin member.

The pin members 104 are mounted in frictional clamping engagement with an arcuate guide or mounting panel or plate 130 fixedly connected to the base frame 32 by an arcuate connector section 132. The mounting plate 130 and connector section 132 are of a curvature similar to the curvature of a path through which the actuator assembly 74 is moved, so that the wheel 114 rolls on the connector section 132 and the assembly is maintained in a constant spatial relationship with the plate 130 and pins 104. The mounting plate 130 is engaged by opposite leg sections 136 and 138 of the pin members 104. The forward or inner leg section 138 has a flat outer surface 140 which is positioned in abutting engagement with an inner surface of the mounting plate 130. The outer or rearward leg section 136 includes a plurality of inwardly projecting retaining protuberances or bumps 144 which engage an outer or rearward surface of the mounting plate or panel 130. The pin members 104 are formed of a resilient spring steel and the leg section 136 is spread apart slightly from the leg section 138 by positioning the pin member 104 in engagement with the mounting panel 138. Thus, the protuberances 144 resiliently engage the mounting panel 130 to clamp the mounting panel between the two leg sections 136 and 138 and frictionally hold the pin member 104 against movement relative to the mounting panel 138.

Energization or operation of the actuator assembly 74 causes the nose section 122 of the core piece or plunger 118 to press upwardly against the drive surface 124 of a tooth 126 on a pin member 104 to overcome the clamping friction between the leg sections 136 and 138 to move the pin member upwardly and advance the popularity indication of the record associated with the pin member. It should be noted that each time the actuator solenoid 108 is energized a pin member 104 is moved by a positive predetermined distance, that is a distance corresponding to the length of a single tooth 126 formed on the inner or forward longitudinally extending edge portion of the leg section 138. Since the teeth 126 have substantially the same length and the plunger 118 has a predetermined unvarying stroke, the pin member 104 is advanced the same distance each time the actuator assembly 74 is energized.

The indicator assembly 76 includes an indicator panel 148 (see FIG. 4) having indicia, in the form of colored bands or strips 150, 152 and 154, which cooperate with the indicator pins 104 to indicate the relative popularity of the records associated with the indicator pins. Other indicia indicating the storage location of the records in the record magazine can be printed or inscribed on the panel 148. Also, indicia or scales, rather than colored bands 150 through 154, can be used in cooperation with the indicator pins 104. The indicator panel 148 is connected to the support panel 130 by mounting posts or columns 156 which extend upwardly from the base frame 32 to support the indicator panel 148 and a pair of spaced apart guide channels or sections 160 and 162 having apertures 164 through which the pin members 104 extend. The pin members 104 are guided in their movements relative to the indicator panel by engagement with side surfaces of apertures 164.

The pin members 104 include a rectangular body section 170 having an upper or outer indicator end surface 172. When the actuator assembly 74 is energized a plurality of times to move a pin member 104 associated with one record upwardly into juxtaposition or alignment with the indicator panel 148, the end surface 172 cooperates with the colored bands 150 to 154 to indicate the number of times a record associated with the indicator pin 104 is played by the automatic phonograph. The greater the extent of juxtaposition or alignment of a pin 104 with the panel 148, the greater is the popularity of the record associated with the indicator pin 104 as indicated by the number of times the record is played. The pin members 104, associated with records which are seldom if ever played, remain substantially in an initial position as shown at 176 in FIG. 4. However, the body sections 170 of indicator pins 104 associated with records having a relatively high degree of popularity are moved into substantial juxtaposition with the indicator panel 148, as shown at 178 in FIG. 4, to indicate the relative popularity of the records associated with these indicator pins.

An indicator pin 104 associated with an extremely popular record is moved a relatively large distance upwardly, due to repetitive operation of the actuator assembly 74, until a lower or end-of-count tooth 182 (see FIG. 5) is engaged by the nose portion 122 of the core piece 118. After the engagement of the end-of-count tooth 182, further operation of the actuator assembly 74 has no effect on the position of the pin member 104. It should be noted that a pair of protuberances 144 are provided adjacent to the lower end of the leg section 136 to hold securely an upwardly extended pin member associated with an extremely popular record. As can be seen in FIG. 5, the pin members 104 are positioned with their rearward or outer longitudinally extending edges closely adjacent to the indicator panel 148 to eliminate parallax between the pins 104 and the bands 150 through 154 on the panel 148. In fact, it is contemplated that the indicator pins may slide against the surface of the panel 148. However, in the preferred embodiment of the invention, the indicator pins 104 are spaced slightly outwardly from the panel 148 to prevent marring or scratching of the panel when the indicator pins are moved relative to the panel.

A register zeorizing or indicator pin return assembly 190 is mounted on an outer or rearward side of the indicator assembly 76. Referring to FIGS. 5 and 6, the zeroizing assembly 190 includes an arcuate longitudinally extending actuator handle or bar 192 which is connected by a pair of parallel spaced apart shafts or plungers 194 and 196 to a longitudinally extending arcuate drive or return bar 198. As can be best seen in FIG. 5, the shafts 194 and 196 extend through guide sleeves or tubes 200 which are mounted on the guide channel or bar 160. A pair of return springs 202 are mounted in a coaxial relationship with the shafts 194 and 196.

The indicator assembly 76 is zeroized or returned to an initial position, with the lower end portions of the pin members 104 adjacent to the support frame 32 and the body section 170 engaging the mounting panel 130, by pressing downwardly on the actuator handle 192 against the springs 202. As drive or return bar 198 is moved downwardly in a parallel relationship with the mounting plate 130, the bar 198 engages outwardly or rearwardly extending feet or protuberances 206 integrally formed with an end portion of the outer leg section 136. As the handle 192 is pressed further downwardly, the return bar 198 presses the feet into the initial position indicated at 208 in FIG. 6 and at 176 in FIG. 4. After the indicator assembly 76 has been zeroized, in the manner previously explained, the handle 192 is released and the return springs 202 urge the handle upwardly to the normal position shown in FIG. 5. Subsequent playing of a record results in the indicator pin associated with the record being moved upwardly from the initial position to count or register the playing of the record to repeat a counting cycle to again check the relative popularity of the records in the record magazine 34.

In order to enhance the understanding of the invention, a modified form of the invention is shown in FIGS. 7 and 8. Since the components of the modified form of the invention are substantially similar to the components of the preferred embodiment of the invention, like numerals have been used to designate like parts with the suffix letter a being employed to distinguish the elements associated with FIGS. 7 and 8. In the embodiment shown in FIGS. 7 and 8, a heart-shaped cam 220 is fixedly mounted on the shaft 82a for rotation contemporaneously with the record magazine. The heart-shaped cam 220 includes a pair of arcuate side surfaces 222 and 224 which meet at a cusp 226 and an obtusely angled point 228. The drive assembly 72a is in an initial position when the follower 90a on the pivot arm 86a is in engagement with the cusp 226 of the heart-shaped cam 220 (see FIG. 7). The actuator assembly 74a is then in the initial position, corresponding to the position shown in dashed lines in FIG. 3.

As the record magazine and heart-shaped cam 220 are rotated in a clockwise direction, the follower 90 is pivoted to the left by a surface 224 from the position shown in FIG. 7 to the position shown in FIG. 8 to move the actuator assembly 74a along a path adjacent to and spaced apart from the indicator assembly 76a. The leftward or counter-clockwise pivoting movement of the arm 86a ends when the follower 90a engages the obtuse point 228 of the heart-shaped cam 220. Further clockwise rotation of the cam 220 brings the follower 90a into engagement with the surface 222 to move the arm 86a back to the initial position of FIG. 7 under the influence of return spring 102a. Thus, a single revolution of the heart-shaped cam 220 moves the actuator assembly 74a from the initial position to the end position indicated in FIG. 8 during the first half of the revolution. During the second half of the revolution, the actuator assembly 74a is moved back to the initial position of FIG. 7.

The record storage locations are offset or spaced radially a slight distance from each other in an area corresponding to the engagement of the follower 90a with the obtusely angled end portion 228 of the cam 220. Therefore, the indicator assembly 74a is aligned with a first group of the pins 104a by the surface 224 and with a second group of indicator pins 104a by the surface 222. As the indicator assembly 74a is moved from the initial position of FIG. 7 to the end position of FIG. 8, a first series of pins will be engaged by the actuator assembly 74a. As the arm 86a is pivoted back to the initial position by the surface 222, the actuator assembly 74a will engage a second series of indicator pins 104a which are spaced between the first series of pins.

The operation of the record popularity meter or counter assembly 70 constructed as illustrated in FIGS. 1 through 8 will be largely apparent from the foregoing description. However, for purposes of affording a more complete understanding of the invention it is advantageous now to provide a functional description of the mode in which the component parts cooperate. After the indicator pins 104 have been placed in the initial position by depressing the handle 192 of the zeroizing assembly 190, the selecting of a record for playing in the automatic phonograph will result in a rotation of the record magazine 34 to position the selected record 38 at the pick-up or transfer station 50 for transfer to the turntable 52. As the record magazine is rotated in a clockwise direction to position the selected record at the transfer station 50, the cam 80 will be rotated in a clockwise direction to pivot the arm 86 and actuator assembly 74 relative to the indicator assembly 76. The playing of the selected record on the turntable 52 will actuate electrical circuitry to energize the actuator assembly 108. Energization of the actuator assembly 108 will move the nose 122 of the core piece 118 into engagement with the teeth 126 on a pin member 104 associated with the record to move or advance the pin member upwardly into increased juxtaposition or alignment with the indicator panel 148. The popularity registration associated with the played record will then have been increased one point or unit, as indicated by the associated pin member 104. Continued selection and playing of various records by customers will result in the pin members 104 associated with the selected records being indexed or moved to increase the popularity rating of the associated records.

After a period of time, the automatic phonograph will be checked by a serviceman who will note the relative popularity of the records in the record magazine 34, as indicated by the inter-relationship between the indicator pins 104 and the indicia or bands 150 through 154 on the indicator panel 148. The records which have received a very low popularity rating will be replaced by other records which, in the opinion of the serviceman, have a greater popularity potential. The indicator assembly 76 will be zeroized by depressing the handle 192 and moving the rearwardly extending feet 206 of the pin members downwardly to the position shown at 208 in FIG. 6. The record popularity meter or counter assembly 70 will then be ready for a second cycle of operation in which the popularity of the records, as indicated by the number of times they are played, will again be determined.

The record popularity meter assembly 70 advantageously includes a compact drive assembly 72 having a cam 80 which is mounted immediately beneath the record magazine 34, as shown in FIG. 2. It should be noted that this drive assembly fits into a relatively small narrow space beneath the record magazine 34. In addition, the drive assembly 72 is positive in its action since the cam 80 is fixedly connected to the shaft 82 which rotates both the record magazine 34 and the cam, so that the cam cannot become out of phase with the record magazine. It should also be noted that the compactness of the playing meter or counter assembly is increased by the arcuate configuration of the indicator assembly 76. This arcuate configuration of the indicator assembly 76 enables the indicator assembly to be positioned immediately adjacent to the generally circular record magazine 34 with a minimum of waste space. Since both the record magazine 34 and the indicator assembly 76 project upwardly from the base frame 32, the record popularity meter or counter assembly 70 does not increase the over-all height of the record changer assembly 30. It should also be noted that the upwardly projecting indicator panel 148 is positioned adjacent to the record magazine 34, so that a serviceman can readily remove records having a low popularity rating from the record magazine while still viewing the indicator panel 148.

In the embodiment of the invention shown, indicator pins 104 have been disclosed with drive teeth 126 to provide a positive movement of the pins each time the actuator assembly is energized. It is contemplated that, in certain embodiments of the invention, the drive teeth could be eliminated. The preferred embodiment of the pin members 104 also includes a pair of leg sections 136 and 138 which clampingly engage the support panel 130 to hold the pin members relative to the panel. Undoubtedly those skilled in the art will devise pin members having a different configuration from the one shown. It is also contemplated that those skilled in the art will provide drive assemblies, which function similar to the drive assembly 72, utilizing drive structures other than the specific embodiment shown to move the actuator assembly 74 relative to the indicator assembly 76. Therefore, while particular embodiments of the invention have been shown, it should be understood, of course, that the invention is not limited thereto since many modifications may be made; and it is contemplated to cover by the appended claims any such modifications as fall within the true spirit and scope of the invention.

What is claimed is:
1. In an automatic phonograph comprising: a base frame, and a record magazine for holding a plurality of records, mounted for rotation relative to said base frame to position a selected record for transfer to a turntable and playing by said phonograph, a record popularity indicating mechanism including a cam member supported by said base frame and being coupled with said rotatable record magazine for movement thereby relative to said base frame in accordance with the movement of said record magazine, an indicator assembly mounted on said base frame adjacent said record magazaine for registering each time a record held in said magazine is selected, and a drive assembly mounted on said base frame in operable relation with said cam member and including actuating means for operating said indicating means in accordance with the positioning of said drive assembly by said cam member.

2. An assembly as set forth in claim 1 wherein: said cam is fixedly mounted relative to said record magazine for rotation contemporaneously with said record magazine to move said drive assembly relative to said indicator assembly as a function of the location of the selected record in the record magazine.

3. An assembly as set forth in claim 2 wherein: said cam is mounted in a coaxial relationship with said record magazine for rotation with said record magazine.

4. An assembly as set forth in claim 3 wherein: said cam is a spiral cam.

5. An assembly as set forth in claim 3 wherein: said cam is a generally heart-shaped cam.

6. An assembly as set forth in claim 2 wherein: said record magazine has a generally circular shape and is mounted for rotation about a central axis to position a selected record for transfer to a turntable and playing by the automatic phonograph; said cam is mounted in a coaxial relationship with said record magazine adjacent to a base of said record magazine, said cam being rotated contemporaneously with said record magazine and engaging said drive assembly to move the latter in an arcuate path relative to said base frame as a function of the rotation of the record magazine relative to said base frame; and said indicator assembly is located outwardly of said cam and has an arcuate radially extending inner portion which is generally similar in shape to the arcuate path through which said drive assembly is moved, said indicating assembly having a plurality of positions therealong, each of which corresponds to one of said plurality of records held in said record magazine, said actuating means being positioned in accordance with the arcuate movement of said drive assembly to operate said indicator assembly at a corresponding position along the arcuate path to increase registrations associated with a selected record of the plurality of records.

7. An assembly as set forth in claim 2 wherein: said indicator assembly includes a plurality of pin members each of which is associated with a record of said plurality of records; each of said pin members being movable for a predetermined distance relative to a support member to register the playing by the automatic phonograph of a record associated with the pin member; and wherein said actuating means includes a member being movable from a first to a second position upon being positioned by said drive assembly relative to said indicator assembly, thereby to move a corresponding pin member said predetermined distance.

8. An assembly as set forth in claim 7 wherein: each pin member of said plurality of pin members includes a plurality of outwardly projecting teeth having drive surfaces which are spaced apart by a distance equal to the predetermined distance which the pin members are moved by said movable member of said actuator means to register the playing of a record, said movable member engaging drive surfaces of successive teeth to move a corresponding pin member to register successive playings of the record associated with the pin member.

9. An indicator assembly mounted on an automatic phonograph having a record magazine for holding a plurality of records for playing by the phonograph, said indicator assembly including: a frame member; a plurality of indication pins having first and second leg sections in clamping engagement with opposite surfaces of said frame member, each indicator pin of said plurality of indicator pins being associated with a record of the plurality of records in the record magazine to indicate relative popularity of each record of said plurality of records; and an actuator assembly including drive means mounted on said phonograph and coupled with said record magazine for movement on a path adjacent to said indicator pins in accordance with the selection of record from said magazine, said drive means including actuator means mounted thereon, said actuator means being positioned relative to said indicator means and operable to move an indicator pin to increase the popularity indication of an associated record each time a record is played by the automatic phonograph.

10. An indicator assembly as set forth in claim 9 wherein: said actuator means includes a member movable from a first to a second position upon being positioned relative to one of said plurality of indicator pins, and wherein said first leg section of each of said indicator pins has a plurality of outwardly projecting teeth which are sequentially engaged by said movable member as said member is moved from said first to said second position, thereby to in turn move said indicator pin a distance corresponding to the length of a tooth each time a record associated with the indicator pin is played by the automatic phonograph.

11. An assembly as set forth in claim 10 wherein: said second leg section of each of said indicator pins includes an outwardly projecting foot and wherein said indicator assembly further includes pin return means mounted thereon, said pin return means including a member movable to engage all of said feet of said indicator pins, thereby to position all of the indicator pins in an initial location.

12. An indicator assembly as set forth in claim 9 further including: an indicator panel connected to said frame member adjacent to an outer end of said indicator pins, said indicator panel including indicia for indicating the relative popularity of the records associated with said indicator pins, said indicator pins being moved into increasing juxtaposition with said indicator panel by the operation of said actuator means to increase the indication of popularity by the indicia on the indicator panel of the records associated with the indicator pins.

13. An indicator assembly as set forth in claim 12 further including: guide means connected to said frame member and engaging said indicator pins for guiding the movement of said indicator pins relative to both said frame member and said indicator panel.

14. In an automatic phonograph comprising: a base frame; a record magazine mounted on said base frame for holding a plurality of records, said record magazine being rotatable relative to said base frame to position a selected record for transfer to a turntable; a cam fixedly connected to said record magazine for rotation relative to said base frame contemporaneously with said record magazine; an indicator assembly mounted on said base frame, said indicator assembly including a plurality of indicator pins each of which is associated with a record of said plurality of records for indicating relative popularity of each record of said plurality of records; a follower lever pivotally mounted on said base frame and in engagement with said cam for movement thereby; and an actuator assembly mounted on said follower lever, said follower lever being moved by said rotating cam in accordance with the selective rotation of said record magazine to in turn position said actuator assembly for engagement with an indicator pin associated with a record which is played by the automatic phonograph, said actuator assembly including means operable each time a record is played to move an indicator pin associated with the record.

15. An assembly as set forth in claim 14 wherein: said indicator assembly includes a mounting plate and each of said indicator pins includes a body section and first and second outwardly extending legs, said first and second outwardly extending legs being in clamping engagement with said mounting plate to hold said pin members against movement relative to said mounting plate, said pin members being moved relative to said mounting plate against the clamping action of said first and second leg sections by operation of said actuator assembly.

References Cited
UNITED STATES PATENTS

| | | |
|---|---|---|
| 2,969,240 | 1/1961 | Vanderzee et al. |
| 3,074,725 | 1/1963 | Rockola. |
| 3,129,005 | 4/1964 | Rockola. |
| 3,165,321 | 1/1965 | Osborne et al. _____ 274—10.1 |

HARRY N. HAROIAN, *Primary Examiner.*